United States Patent Office 2,717,254
Patented Sept. 6, 1955

2,717,254

NITRO ALKYL DERIVATIVES OF NITROTHIO-PHENEMETHANOL

Robert E. Miller, Dayton, Ohio, assignor to Monsanto Chemical Company, St. Louis, Mo., a corporation of Delaware No Drawing. Application August 5, 1954, Serial No. 448,144

4 Claims. (Cl. 260—332.3)

The present invention deals with thiophene compounds and more particularly relates to derivatives of thiophenemethanol and to methods of preparing the same.

According to the invention there are provided certain new and valuable 5-nitro-(α-nitroalkyl)-2-thiophenemethanols by the condensation of an alkali metal bisulfite addition complex of 2-thiophenecarboxaldehyde, i. e., an alkali metal α-hydroxy-2-(5-nitrothiophene)methanesulfonate, with an alkali metal salt of a nitroalkane, substantially according to the scheme:

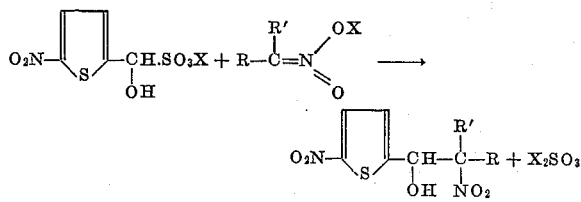

in which X is alkali metal, R is selected from the class consisting of hydrogen and alkyl radicals of from 1 to 3 carbon atoms and R' is selected from the class consisting of hydrogen and the methyl radical.

Useful bisulfite complexes for preparing the present α-nitroalkyl nitrothiophenemethanols are the sodium or potassium α-hydroxy-2-(5-nitrothiophene)methanesulfonates. From such complexes and the indicated nitroalkanes, the following 5-nitro-α-(nitroalkyl)-thiophenemethanols are obtained:

| Nitroalkane | 2-Thiophenemethanol |
|---|---|
| nitromethane | 5-nitro-α-(nitromethyl)-. |
| nitroethane | 5-nitro-α-(1-nitroethyl)-. |
| 1-nitropropane | 5-nitro-α-(1-nitropropyl)-. |
| 2-nitropropane | 5-nitro-α-(1-methyl-1-nitroethyl)-. |
| 1-nitrobutane | 5-nitro-α-(1-nitrobutyl)-. |

The present 5-nitro-a-(nitroalkyl)thiophenemethanols are well defined compounds which may be used for a variety of industrial and agricultural purposes, e. g., as agricultural fungicides and as nematocides. They are particularly valuable as starting materials for the production of 5-nitro-2-(nitroalkenyl)thiophenes by the process described in my copending application Serial No. 448,145 filed of even date herewith.

In preparing the present 5-nitro-α-(nitroalkyl)thiophenemethanols, the 5-nitro-2-thiophenecarboxaldehyde-bisulfite complex is simply contacted with the nitroalkane salt in the presence of an inert diluent at ordinary or moderately increased temperature, and the resulting reaction mixture is allowed to stand until formation of the substituted thiophenemethanol has been completed. When the diluent or solvent is water, or some other liquid which is a non-solvent for the 5-nitro-α-(nitroalkyl)thiophenemethanol and a solvent for the by-product alkali metal salt, the alcohol generally precipitates out, and may be recovered from the reaction mixture simply by filtering.

The invention is further illustrated, but not limited, by the following example:

Example

An aqueous sodium bisulfite solution was prepared by adding 5.8 g. of the sulfite to 100 cc. of distilled water and to the solution there was added with vigorous stirring 8.9 g. (0.56 mole) of 5-nitro-2-thiophenecarboxaldehyde. To the resulting reaction mixture there was then added, with ice bath cooling and vigorous stirring, 4.4 g. (0.56 mole) of nitroethane which had been dissolved in 10 cc. of distilled water that contained 2.6 g. of sodium hydroxide. The whole was stirred for 2 hours and then allowed to stand overnight. The orange precipitate which had formed in the reaction mixture was filtered off and recrystallized from benzene to give the substantially pure 5-nitro-α-(1-nitroethyl)-2-thiophenemethanol, M. P. 113–114° C. and analyzing as follows:

| | Found | Calcd. for $C_7H_8N_2O_5S$ |
|---|---|---|
| Percent C | 36.93 | 36.22 |
| Percent H | 3.42 | 3.45 |

5-nitro-α-(1-nitroethyl)-2-thiophenemethanol was found to inhibit the growth of the fungus *Aspergillus niger*, and to be easily converted to 5-nitro-2-(2-nitropropenyl)thiophene which is of high utility as a biological toxicant and as a polymerizable monomer.

What I claim is:

1. A compound having the formula

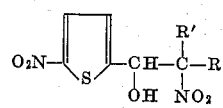

in which R is selected from the class consisting of hydrogen and alkyl radicals of from 1 to 3 carbon atoms and R' is selected from the class consisting of hydrogen and the methyl radical.

2. 5-nitro-α-(1-nitroethyl)-2-thiophenemethanol.

3. The process which comprises contacting an alkali metal α-hydroxy-2-(5-nitrothiophene)methanesulfonate with an alkali metal salt of a nitroalkane of the formula

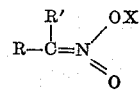

in which R is selected from the class consisting of hydrogen and alkyl radicals of from 1 to 3 carbon atoms, R' is selected from the class consisting of hydrogen and an alkyl radical and X is an alkali metal and recovering from the resulting reaction product a 5-nitro-α-(nitroalkyl)-2-thiophenemethanol of the formula

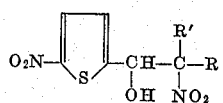

in which R is selected from the class consisting of hydrogen and alkyl radicals of from 1 to 3 carbon atoms and R' is selected from the class consisting of hydrogen and the methyl radical.

4. The process which comprises contacting an aqueous solution of sodium α-hydroxy-2-(5-nitrothiophene) methanesulfonate with an aqueous solution of the sodium salt of nitroethane and recovering 5-nitro-α-(1-nitroethyl)-2-thiophenemethanol from the resulting reaction product.

References Cited in the file of this patent

UNITED STATES PATENTS 2,680,117    Hermann _____ June 1, 1954

OTHER REFERENCES

King et al., J. Organic Chem. 14:405–410 (1949).